United States Patent Office 3,435,849
Patented Apr. 1, 1969

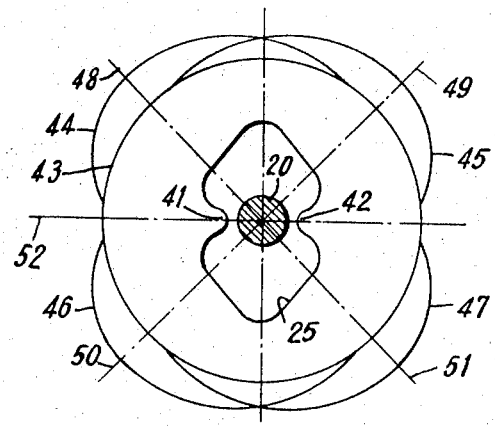
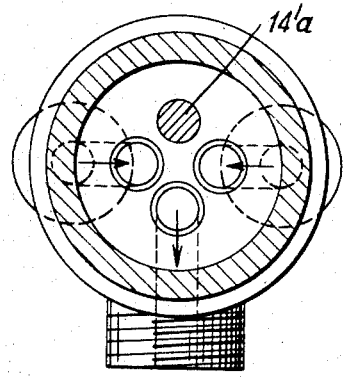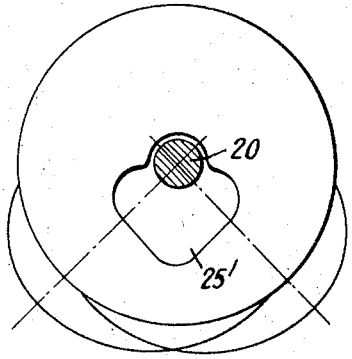

3,435,849
MECHANICAL MIXING TAP
Paul Saffin Von Corpon, 4 Rue de l'Athenee,
Geneva, Switzerland
Filed Jan. 26, 1966, Ser. No. 523,079
Claims priority, application Switzerland, Feb. 2, 1965,
1,425/65
Int. Cl. F16k 11/18
U.S. Cl. 137—625.4                              6 Claims

ABSTRACT OF THE DISCLOSURE

A mixing tap in which an actuating dog on a ball and socket handle directly contacts a surface of a revolution of a rockable plate to control the openings of water inlets and outlets. The surface of revolution has a central region which is spherical, and when the dog is in contact with this spherical surface all the openings are closed. A surface of revolution extends from the spherical region and it has a curvature which is greater than that of the central region, for controlling the opening of the inlets and outlets when the dog moves out of the central region.

---

The present invention relates to a mechanical mixing tap of the type including a ball-and-socket handle and provided with an actuating dog, an oscillating plate controlled by this dog and carrying at least three and at most four spherical-headed valves disposed symmetrically relative to the center of the plate and each controlling a seat belonging to a water circulation duct, these ducts serving respectively for the inlet of hot water, for the inlet of cold water, and for at least one water outlet issuing from these inlets, the seats being symmetrical one to the other and relative to the axis of the tap.

The mixing tap according to the invention is characterized in that the part of the oscillating plate which cooperates with the end of the actuating dog has a surface with the shape of a surface of revolution the central area of which is a spherical surface with a center on the axis of the tap and which corresponds to a necessary closure zone for all the valves, whereas the peripheral region of the surface of revolution corresponding to the different operative positions of the dog which themselves correspond to different necessary opening positions of the valves, independently of the water pressure, is formed as a surface of revolution, coaxial with said spherical surface and produced by rotation about said axis, of a curved arc proceeding from the edge of the spherical surface and having a greater curvature to move progressively inwards relative to the spherical surface as measured in increasing distance of the arc from said axis.

The accompanying drawing shows, by way of example, two embodiments of the tap according to the invention.

FIG. 6 is an explanatory diagram.

FIG. 7 is a view similar to FIG. 3 but relative to the second embodiment.

FIG. 8 is a diagram similar to FIG. 6 but relative to this second embodiment.

Figure 3:
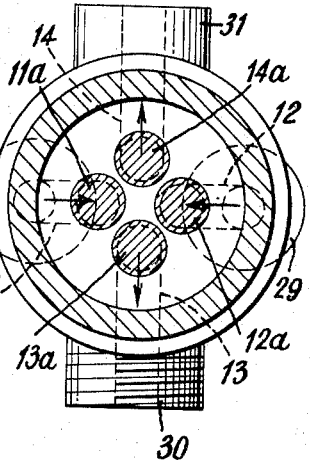
FIG. 3 is a sectional view along 3—3 of FIG. 1.
Figure 4:
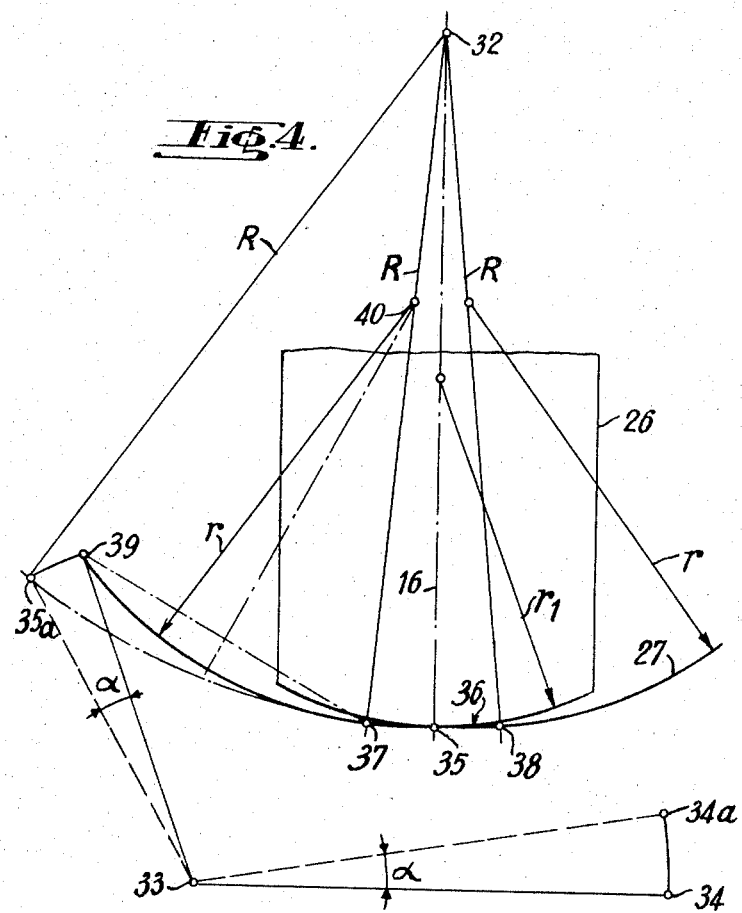
FIG. 4 is an explanatory diagram.
Figure 5:
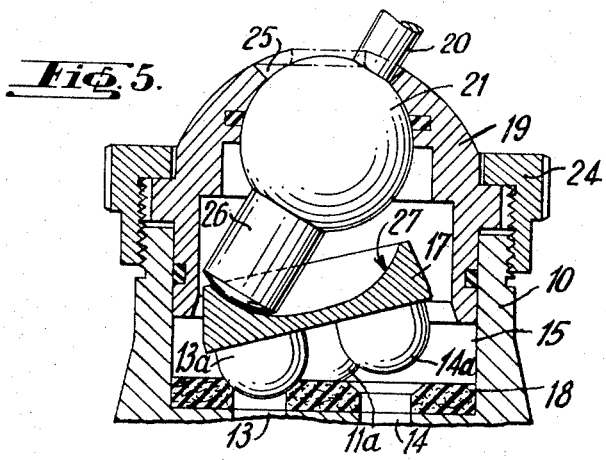
FIG. 5 is a partial section along 5—5 of FIG. 2, showing the members in an open position.

The mechanical mixing tap shown in FIGS. 1 to 6 comprises a body 10 having four water circulation ducts 11, 12, 13, 14 serving respectively for the hot water inlet, for the cold water inlet (FIG. 1), for the outlet of the mixed water to the bath and for the outlet for the shower (FIG. 5). These four ducts issue into a mixing chamber 15, through four seats disposed symmetrically relative to the axis 16 of the tap.

In order to control selectively the passage of the water through these seats there is provided in the chamber 15 an oscillating plate 17 carrying, fixed thereto, four hemispherical-headed valves 11a, 12a, 13a, 14a, disposed symmetrically relative to the center of this plate and provided to cooperate respectively with four seats provided to cooperate respectively with four seats provided in a plate of flexible material 18.

The chamber 15 is closed by a cap 19 fixed to the body 10 by means of a nut 24. A handle 20 with a ball joint 21 serves to control the operation of the tap. Joints 22 and 23 disposed respectively between the cap 19 and the body 10 and between the ball joint 21 and the cap 19, ensure water-tightness between these members. The ball joint 21 is disposed in the chamber 15 and the handle 20 passes through a central opening 25 of the cap. The ball joint has a dog 26, diametrically opposite the handle 20. This dog cooperates with the surface of a cup 27 made in the face of the plate 17 facing the valves.

The hot water and cold water supply pipes are screwed on the threaded parts 28, 29 respectively of the body 10. The pipes leading from the tap to the bath and to the shower are respectively fixed on the parts 30, 31 of the body 10 (FIGS. 2 and 3).

Figure 2:
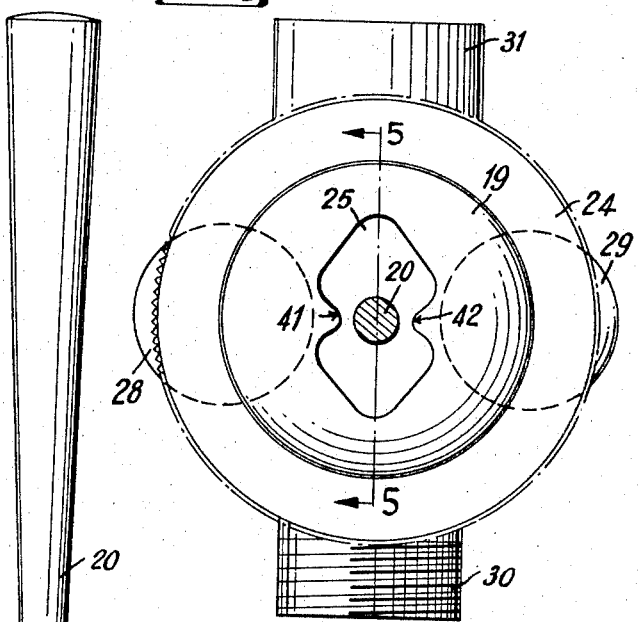
FIG. 2 is a view along 2—2 of FIG. 1.
Figure 1:
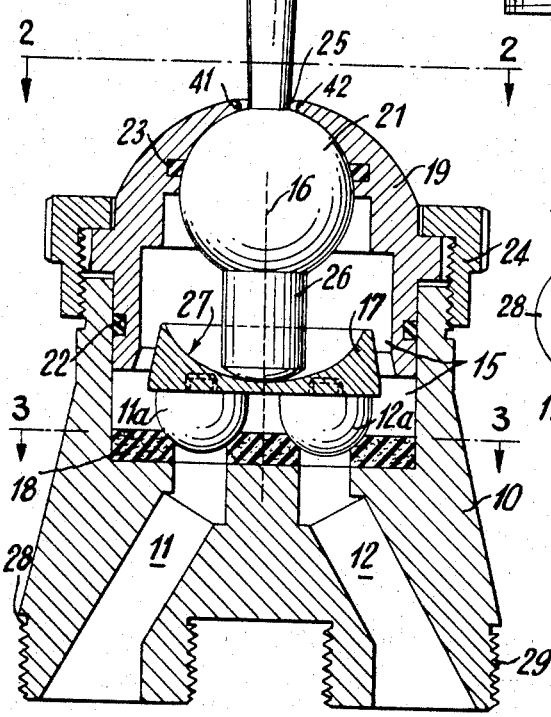
FIG. 1 is a view in axial section, in the closed position of the tap according to the invention.

The edge of the opening 25 of the cap 19 forms a curve having two symmetrical branches, each being C-shaped, these two C-shaped branches having their concavities facing towards one another (FIGS. 2 and 6).

As regards the cup 27 and the dog 26, their shape will now be described with reference to FIG. 4.

Shown at 32 is the center of the ball joint 21, at 33 the center of the hemisphere 11a (or 13a) and at 34 the center of the hemisphere 12a or (14)a, when the valves are in the closed position. Let us suppose that the valve 12a opens to the maximum value. The plate 17 then oscillates through an angle α about the center 33 of the symmetrical valve 11a and comes to the position 34a. The axis of the handle originally occupies the vertical position in FIG. 4, the handle entering into contact with the cup at its center. When 12a is raised to the maximum, the central point 35 of the end of the dog 26, reaches point 35a. R is the radius of the sphere (dot and dash circle in FIG. 4) which may be described by the point 35 about 32 as a center.

The central area 36 of the cup is a spherical cap of radius R and center at 32. The points 37, 38 in FIG. 4, define the edge of this cap.

In order to determine the shape of the cup 26 in its area surrounding the cap 36, the procedure is as follows. From 37 and 38 two radii are drawn passing through 32. From the point 33 as a center an arc of a circle from 35a is struck through an angle α from the straight line 33–35a to determine point 39. The point 39, as already stated, is the spot where the point of contact 35a on the cup must be found when the tap is closed. The mediating line of the straight segment 37–39 and the intersection of this mediating line with the radius 32–37, determines a point 40. This point is the center of a circle of radius r passing through 37 and 39 and tangent at 37 to the central spherical cap 36. The arc of this circle joining 37 and 39 is drawn and, as seen in section, there is produced the left-hand half of the cup in FIG. 4. The right-hand half is symmetrical because the arc 37–39 is formed into a surface of revolution about the axis 16 of the tap.

As regards the end of the dog 26, it has the shape of a spherical cap, the radius $r_1$ (smaller than R) establishing contact with the cup at its center when the tap is closed.

The operation of the tap is the following. When one inclines the handle 20, the dog 26 causes the plate 17 to oscillate and forces one or several of the valves to open, according to the position in which this handle is brought.

When the handle is brought into the upper half (in FIGS. 2 and 6) of the opening 25, the valve 14a opens and the water proceeds to the shower. The amount of opening regulates the flow, and the inclination of the handle relative to the vertical in FIG. 2, regulates the mixture.

When the handle is in the lower half of the opening 25 (FIGS. 2 and 6), the valve 13a controlling the flow to the bath is open.

When the handle is on the vertical axis of FIGS. 2 and 6, the hot water and the cold water inlet valves 11a, 12a, are open to an equal extent. The further the handle is moved to the right, the more the cold water is fed and the less the hot water. The reverse is true in the other case.

The shape given to the edge of the opening 25, with the two parts 41, 42 leaving between them a distance very slightly exceeding the diameter of the handle at this point, has the following advantage: To turn from the bath position to the shower position, or inversely, the handle must necessarily pass through the closed position. One thus avoids false manoeuvres through inadvertence.

The diagram in FIG. 6 shows the operation of the tap. The circle 43 represents the zero value of the outputs. The distances measured radially outwards from this circle correspond to a scale of flow. Curve 44 represents the variation of the hot water flow to the shower, as a function of the inclination of the handle relative to the axis of the tap as a function of the angular position of this handle in FIG. 6. Similarly, the curve 45 represents the cold water flow to the shower, the curve 46 the hot water flow to the bath, and the curve 47 the cold water flow to the bath, as a function of said inclination and of said position.

For each position of the handle included between 48 and 49 or between 50 and 51, the practically constant flow of the tap is equal to the total of the hot water and cold water outputs corresponding to this position, the position 48 of the handle corresponding to the maximum flow of hot water to the shower, the cold water flow being then zero. Similarly, 49 represents the maximum shower cold flow, at 50 the maximum bath hot flow and at 51 the maximum bath cold flow. When the axis of the handle approaches the line 52, the handle is necessarily brought back to the center, due to 41 and 42, which corresponds to complete closure, the point 35 being between 37 and 38 (FIG. 4).

The embodiment described of the cup 27 has the following particularities: The part of this cup which surrounds the central area 36 is shown, in axial section, by an arc of a circle of radius r which, in its outer area separates itself progressively from the sphere to which belongs the cap 36, towards the inside of this sphere, as one diverges from the axis of the tap. Thus the amount of inclination of the handle corresponds to the amount of necessary opening of the valves. When the handle is in contact with the central area 36, the dog 26 produces the necessary closure of all the valves. It is thus seen that the opening and the closing of the valves is completely independent of the pressure in the hot water and cold water inlet ducts. The tap is thus of perfectly reliable operation.

In the example according to FIGS. 7 and 8, the tap comprises a single outlet, such as 30 of the first example. Four valves are provided as in the first case, but the valve 14a' here cooperates with a blind hole. The operation of this tap is illustrated in FIG. 8, the flow curves corresponding to those of the lower half of FIG. 6.

In this example, the curve 25' is, in its lower half, that of the lower half of the curve 25. The upper half of 25' completely surrounds the handle, thus immobilizing it in the central closing position.

What I claim is:
1. A mechanical mixing tap comprising a ball-and-socket handle with an actuating dog, a freely rockable plate controlled by said dog and carrying spherical shaped valves disposed symmetrically relative to a plane of symmetry passing through the center of the plate perpendicularly thereto, each spherical valve controlling an opening of a water circulation duct, the ducts serving respectively for the inlet of hot water, for the inlet of cold water, and for at least one water outlet, the openings being symmetrical one with respect to the other and relative to said plane of symmetry, said rocking plate including a portion which cooperates with the actuating dog for controlling the inlet and outlet of water, said portion having a concave surface of revolution, the central region of which is a concave spherical surface with a center on the axis of the tap, said valves all being closed when the dog contacts said spherical surface, whereas for the different operative positions, the dog acts in a peripheral region of said surface of revolution, the positions of the dog in the peripheral region corresponding to different opening positions of the valves, independently of the water pressure, said peripheral region being a surface of revolution, substantially coaxial with said spherical surface and produced by the rotation about said axis, of a curved arc extending from the spherical surface and having a greater curvature than that of the spherical surface to move progressively inwards relative to the spherical surface as measured in increasing distance of the arc from said axis.

2. A tap according to claim 1 wherein said curved arc is an arc of a circle having a center which lies on a radius passing through the edge of said spherical surface.

3. A tap according to claim 1 wherein said dog has an actuating end which contacts said surface of revolution, said actuating end of the dog having a spherical surface of smaller radius than that of said spherical surface of the rocking plate.

4. A tap according to claim 1 further comprising a guide member surrounding the handle for limiting the inclination of the handle, said guide member having a shape to constrain the handle to be in the center, in order to effect total closure of the tap, at the end of the travel on either side of the central position of said handle corresponding to a mixture of equal quantities of water from the two inlets, said guide member being formed by the edge of an opening in a cover-cap and through which opening passes the handle, said edge having the shape of a symmetrical curve relative to the axial plane passing through the openings corresponding to the hot and cold ducts, each of the halves of this curve being of general C-shape, in which the C-shapes have their concavities one facing another.

5. A tap according to claim 4 wherein two outlets are provided, one for a bath and the other for a shower, and four valves are provided, said guide member forcing the handle to be in the closed position of the four valves at each transition of the stroke between bath and shower, said four valves controlling the two inlets and the two outlets respectively.

6. A tap according to claim 4 wherein a single outlet and three valves are provided, wherein said guide member surrounds half the periphery of the handle when the latter is in the position of closure of the three valves controlling the two inlets and the outlet.

References Cited

UNITED STATES PATENTS 3,126,914   3/1964   Dombre _____ 137—625.4

M. CARY NELSON, *Primary Examiner.*

M. O. STURM, *Assistant Examiner.*